United States Patent Office 3,300,370
Patented Jan. 24, 1967

3,300,370
POLYURETHANE-POLYAMIDE ARTICLE AND
METHOD OF PREPARATION
Michael Mandel Epstein, Columbus, Ohio, and Joseph Edgar Rhoads, Wilmington, Del.; said Epstein assignor, by mesne assignments, to J. E. Rhoads & Sons, Inc., Wilmington, Del., a corporation of Delaware
No Drawing. Filed July 8, 1965, Ser. No. 470,621
12 Claims. (Cl. 161—190)

This application is a continuation-in-part of copending application Serial No. 236,159 filed November 7, 1962 and now abandoned.

This invention relates to an article comprised of a polyamide bonded to a polyurethane and a method of preparation of the same. More particularly, the invention includes: a laminated article comprised of a molecularly oriented or unorientated synthetic polyamide firmly bonded to a thermoplastic polyurethane elastomer, which is substantially free of cross-linkages; and a method of preparation of the article, which method comprises softening of the surface of the polyamide with a solvent mixture consisting essentially of a solvent-softening agent for the polyamide and a solvent-softening agent for the thermoplastic polyurethane elastomer.

The article of the invention is extremely useful as a belt or belting material for driving pulleys and the like in power transmission devices. The article also is useful as a conveyor belt, as strapping in power transmission devices, as seals for containers, and the like. As is known, products for such applications require a material which combines high tensile strength with a high coefficient of friction, excellent abrasion resistance, and satisfactory oil and solvent resistance. The article of manufacture of the invention meets such requirements by combining the above properties with good thermal resistance and substantial retention of physical properties upon aging. In addition, the article of the invention, because of the thermoplastic nature of the bonded-together polyamide and polyurethane components, can be fabricated in numerous configurations and diverse shapes.

Past belting materials have included leathers, synthetic polyamides, and various combinations of materials, such as leather and polyamide, polyamide and Hycar (copolymers of butadiene and acrylonitrile), and the like generally in a plylike arrangement or form. Belting materials, such as rubber, also have been reinforced with cords, wires, fibers, fabrics, and the like. In general, numerous belting materials have possessed a limited utility because of a low coefficient of friction or other undesirable property and, thus, a low efficiency in power transmission. Also, because of relatively low strength of orientated polyamides in the transverse direction of the belt, in most belts of a polyamide or of a polyamide in combination with other materials, the polyamide in the belt has tended to split in the longitudinal direction.

A relatively recently developed belting material has comprised a thermoset polyurethane elastomer bonded to a synthetic polyamide. In this belting material, the polyurethane elastomer reinforces the polyamide sufficiently to avoid longitudinal splitting of the polyamide under normal uses. In addition, the polyurethane component of such a belting material has been characterized by a high cofficient of friction, excellent adhesion to the polyamide, and high oil, abrasion, and aging resistance. In most instances, such belting materials comprise two components (the polyamide and the thermoset polyurethane) with the polyurethane being at least on those surfaces which generally are referred to as contact or pulley contacting surfaces, in order to impart the requisite high coefficient of friction. U.S. Patent 2,999,764, Rhoads, illustrates belting materials of this type and describes their preparation as involving a softening pretreatment of the polyamide surface, an applying of a liquid composition forming the polyurethane elastomer to the pretreated polyamide surface, and a curing of the applied liquid composition in situ.

In general, the present invention includes a process involving a wetting and softening pretreatment of a polyamide surface, usually a wetting and softening pretreatment of both the polyamide surface and a surface of a thermoplastic polyurethane solid elastomer, with a solvent mixture consisting essentially of a solvent-softening agent for the polyamide and a solvent-softening agent for the thermoplastic polyurethane. The wetted and softened pretreated surface of the polyamide, when no longer visibly wet yet still tacky and softened, is brought in contact with the polyurethane surface and maintained in contact until the bond matures. When surfaces of both the polyamide and polyurethane are pretreated, the wetted and softened pretreated surfaces of each, when no longer visibly wet, yet still tacky and softened, are brought into contact with each other and maintained in contact until the bond matures.

The process of the invention produces an article comprised of a synthetic polyamide, having at least one surface thereof firmly bonded to a surface of a thermoplastic polyurethane solid elastomer. The article, in cross-sectional view thereof, appears to be a laminated article comprised of at least one ply of the polyamide having a surface thereof adhered to the surface of a ply of the polyurethane elastomer. The article may contain more than one layer or ply each of the polyamide and the polyurethane, and/or other prior art belting materials, so long as at least one ply of the polyamide has a surface thereof bonded to a surface of the polyurethane. The article may contain conventional reinforcing materials, per se, and/or intermediate various ply materials. While for numerous belting applications, the article usually is an endless flat belt composed of sheets or plies of the polyamide and the polyurethane firmly bonded together, in some applications other shapes are more desirable. As illustrative thereof, the article may be in the shape of a washer, a grommet, a cylindrical hose, and the like; also, one or more of the laminated materials, in particular pulley contacting surfaces of the article, rather than being flat-surfaced may be of an embossed surface, or a ridged surface, or a geared or toothed surface for a better driving of pulleys, gears or the like.

The present invention employs a polyurethane elastomer, which is thermoplastic and which is substantially linear in structure and free of cross-links. In contrast, the polyurethane elastomers employed in belting materials, such as illustrated by Rhoads, U.S. Patent 2,999,764, are thermosetting in nature and cured, in situ, to a thermoset state, and possess substantial cross-links in their thermoset structure. Similar belting materials, prior to this invention, apparently could be prepared only by curing liquid thermosetting polyurethane elastomers in situ with a pretreated softened surface of the polyamide. Attempts to bond a cured solid slab of a thermosetting polyurethane to a polyamide invariably result in weak, unsatisfactory bonding. In the present invention, the thermoplastic polyurethane is a solid, and as a solid is applied and satisfactorily bonded to the pretreated softened surface of the polyamide. Also, in contrast to such prior art belting materials wherein it was possible to cast and cure only thin layers of liquid thermosetting polyurethane and still obtain an adequate bond between the polyurethane and the polyamide, a solid thermoplastic polyurethane of any desired thickness may be bonded to the polyamide by the present invention. In the present invention, the thermoplastic polyurethane advantageously also may be compounded with filler and/or reinforcing materials and a slab of the compounded composition bonded to a pretreated softened surface of a polyamide to provide a satisfactory belting material.

Polyamides or nylons, in general, are suitable for the polyamide component of the belting materials of the present invention. For example, those polyamides prepared by the interaction of adipic acid and hexamethylene diamine, or of beta-methyladipic acid and hexamethylene diamine, or of the polymerization of caprolactam, are useful. The preferred polyamides or nylons are those which have high tensile strength because of molecular orientation. Such useful polyamides are well known to the art and many are commercially available. For example, E. I. du Pont de Nemours & Company, under the name of "Zytel 211" and Allied Chemical Corporation, under their No. 8205, sell polyamides, which may be extruded or cast into solid form and drawn for molecular orientation purposes.

Broadly, the polyurethane elastomers which are useful in this invention are thermoplastic solid elastomers which are substantially free of cross-links, but which have the appearance and many properties of cross-linked polyurethane vulcanizates. In general, these polyurethane elastomers are derived from specific reactants in critical ratios. U.S. Patent 2,871,218, Schollenberger, is illustrative of teachings of the preparation of polyester derived urethane elastomers. Schollenberger teaches polyesterurethane elastomers may be prepared by reacting 1.0 mol of a hereinafter defined polyester having a molecular weight greater than 600 and less than 1200, with about 1.1 to 3.1 mols of a diphenyl diisocyanate in the presence of about 0.1 to 2.1 mols of a free glycol containing from 4 to 10 carbon atoms. The ratio of free glycol to diphenyl diisocyanate is critical, and the recipe employed must be balanced so that there is essentially no free, unreacted diisocyanate or glycol remaining after the reaction to form the elastomer. The amount of glycol employed depends on the molecular weight of the polyester desired. After heating the mixture of reactants to form the elastomer, no further treatment is required to develop the physical property of the elastomer. The polyesters, utilized in the preparation of these polyesterurethanes, include polyesters prepared from the esterification of such dicarboxylic acids as adipic, succinic, pimelic, suberic, azelaic, sebacic, and the like or their anhydrides. Preferred acids are those dicarboxylic acids of the formula HOOC-R-COOH, where R is an alkylene radical containing 2 to 8 carbon atoms. More preferred are those represented by the formula $HOOC(CH_2)_xCOOH$, where $x$ is a number from 2 to 8. Adipic acid is generally preferred. The glycols, reacted with the dicarboxylic acids for preparation of the polyesters which are useful in preparation of the polyesterurethane elastomers are either straight-chain aliphatic glycols containing between 4 and 10 carbon atoms or polyoxyalkylene glycols containing from 2 to 5 oxalkylene repeating units. Preferably, the straight-chain aliphatic glycols are of the formula $HO(CH_2)_xOH$, wherein $x$ is 4 to 8. Butanediol-1,4; hexamethylenediol-1,6; octamethylenediol-1,8 and the like are representative of these preferred aliphatic glycols, butanediol-1,4 being particularly preferred. Preferred polyoxyalkylene glycols are of the formula $$HO(CH_2CHRO)_xH$$

wherein $x$ is 2 to 4 and R is hydrogen or methyl. Representative polyoxyalkylene glycols of this formula include diethylene glycol, triethylene glycol, tetraethylene glycol, diproplyene glycol, tetrapropylene glycol and the like, the particularly preferred glycols being diethylene glycol and dipropylene glycol.

It will be appreciated by those skilled in the art that a mixture of aliphatic glycols or a mixture of polyoxyalkyl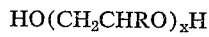 glycols or a mixture of both glycols may be employed for reaction with one or more of the above dicarboxylic acids to produce polyester intermediates for subsequent reaction with the selected diisocyanate so as to vary the properties of the resulting polyesterurethane to fit its particular application in conjunction with the selected polyamide. Similarly, mixed polyesters obtained by mechanical blending of preselected polyesters derived from aliphatic glycols or polyoxyalkylene glycols or mixtures of both types of polyesters may be employed.

Polyurethane elastomers may also be obtained by reacting diisocyanates directly with polyoxyalkylene glycols having a molecular weight greater than 600 and less than 2500 and obtained by the condensation of alkylene oxides such as ethylene oxide and propylene oxide to yield glycol of the formula $HO(CH_2CHR-O-)_yH$ wherein $y$ is a number greater than 14 and R is hydrogen or methyl. The polypropylene glycols are especially preferred because they have a larger liquidus range with increasing molecular weight and are more easily processed to obtain the polyetherurethane elastomer. Mixtures of these polyoxyalkylene glycols and mixtures thereof with one or more of the above described polyesters may also be employed for reaction with the selected diisocyanate to obtain polyurethane elastomers of varied properties. Mechanical blends of the described polyurethanes may also be suitable.

The diphenyl diisocyanates useful in producing the polyurethane elastomers include diphenyl methane diisocyanate, diphenyl methane-p,p'-diisocyanate, dichlorodiphenyl methane diisocyanate, dimethyl diphenyl methane diisocyanate, diphenyl dimethyl methane diisocyanate, bibenzyl diisocyanate, diphenyl ether diisocyanate, and the like. Preferred are the diphenyl methane diisocyanates, with extremely useful polyesterurethane elastomers being prepared from employment of diphenyl methane-p,p'-diisocyanate. The amount of diphenyl diisocyanate which is used depends upon the amount of free glycol and polyester and should be in amount equivalent to these latter two reactants, so that there are essentially no free unreacted isocyanate and hydroxyl groups remaining in the polyurethane elastomer. The amount of diphenyl diisocyanate in each case depends upon the hydroxyl number molecular weight of the polyether or polyester and glycol mixture. For example, when employing polytetramethylene adipate of molecular weight of 850, the preferred ratio for an elastomer of optimum physical properties is about 1.70 mols of diphenyl methane-p,p'-diisocyanate, 1.0 mol of poly(tetramethylene adipate) and about 0.70 mol of butanediol-1,4; when polytetramethylene adipate with a molecular weight of 1010 is used, the preferred ratio is 2.06/1.00/1.06.

In accordance with the present invention, the surface of the polyamide to which the polyurethane is to be bonded is wetted and softened with a solvent mixture consisting essentially of a solvent-softening agent for the polyamide and a solvent-softening agent for the polyurethane, although usually the surfaces of both the polyamide and the polyurethane which are to be bonded together are wetted and softened with the solvent mixture. If desired, one solvent mixture may be applied to the surface of the polyamide and another solvent mixture applied to the surface of the polyurethane, although each employed solvent mixture should contain a solvent-softening agent for the polyamide and a solvent-softening agent for the polyurethane. Useful solvent-softening agents for the solvent mixture are known. For example, solvent-softening agents, such as aromatic hydroxy compounds and the lower fatty acids, are known for the polyamides. Illustrative of the aromatic hydroxy compounds are phenol, cresol, resorcinol, phloroglucinol, hydroquinone, and the like. Formic and acetic acids are illustrative of the fatty acid group of solvent-softening agents for polyamides. Preferred are the aromatic hydroxy compounds. The polyurethane softening agents include tetrahydrofuran, dimethyl formamide, and numerous ketonic solvents, for example, cyclohexanone, tetramethyl urea, dioxane, and the like. In applications where one or more of the solvent-softening agents are solids, it is desirable in the solvent mixture to use a minor but sufficient amount of another solvent, such as a diluent organic solvent for the solid solvent-softening agent, for example an aromatic hydrocarbon, lower alkanol, lower ketone, and the like, so that the applied solvent mixture is a solution which can be readily and uniformly applied to wet the desired surfaces of the components of the belting material product.

The solvent mixture contains both a softening agent for the polyamide and also a softening agent for the thermoplastic polyurethane. Each solvent-softening agent may comprise from 10 to 90 percent of the solvent mixture. Preferably, the solvent mixture is prepared from softening agents which are liquid solvents, at the temperature of application, for one or both of the polyamide and thermoplastic polyurethane components of the belting material. Desirably, the solvent admixture contains from 40 to 60 percent by weight, preferably about equal parts each of two of solvent-softening agents, an individual agent for each of the polyamide and polyurethane components. In general, the solvent mixture is prepared by merely mixing, usually by agitation, of the solvent-softening agents and any other diluent organic solvents which are included.

In practice of the invention, the solvent mixture is applied, such as by dipping, brushing, knife-coating, spraying, or other like methods and techniques known to the art, in an amount sufficient to wet, desirably to wet uniformly, the surfaces of the polyamide and the polyurethane which are to be the interfacial surfaces when united and bonded together.

The amount of the solvent admixture which is applied to the surfaces which are to be bonded together only need be an amount sufficient to wet the surfaces with a film of the solvent mixture which is barely perceptible to the eye, and generally a film which is only a few thousandths of an inch thick. In most instances, in a matter of a few seconds to several minutes after application, the surfaces on which the solvent admixture has been applied in such amounts no longer appear visibly wet, but, if touched with the finger, appear to be softened and slightly tacky. Where larger amounts of the solvent mixture are applied, somewhat longer times are necessary before the wetted surfaces no longer are visibly wet yet are still tacky and softened. The tacky surfaces of the polyamide and the polyurethane then are quickly brought in contact and held in contact until bonding occurs. To aid in bonding, it generally is desired to employ moderate pressures up to about 100 to 150 pounds per square inch to hold the softened and tacky surfaces together. To expedite the time necessary for the bond to mature, moderate temperatures up to about 180° to 225° F. are useful, although satisfactory bonding generally will occur within several hours at room temperature or thereabout. Of course, with a molecularly orientated polyamide and/or polyurethane, any elevated temperature employed should be low enough to avoid substantial loss of molecular orientation. Hot-pressing at moderate pressures and temperatures is extremely useful. Desirably, the softened and tacky surfaces are maintained in contact with each other by hot-pressing for from a few minutes to several hours and then permitted to stand and age for about 24 hours or longer before being placed in use or tested. Hot-rolling, cold-pressing, and the like also are useful to hold the tacky surfaces of the polyurethane in contact until bonding occurs.

It is important in practice of the invention that the solvent admixture be applied to at least the surface of the polyamide, most desirably to the surfaces of the polyamide and the polyurethane, which are to be united, and that the applied solvent mixture contain one or more solvent-softening agents each for the polyamide and for the polyurethane elastomer. Where the solvent mixture consists essentially of one or more solvent-softening agents for only one of the components of the belting material, or where a solvent mixture containing solvent-softening agents for both components is applied only to the polyurethane belting component, the resulting bond between the two belting components is of such a low strength as to not be satisfactory. In such instances, the resulting bond, for example, as measured by peel strength from attempting to peel the polyamide component from the polyurethane component, will be only one-half or less the bond obtained by the process of the invention. In fact, by the process of the invention, peel strength measurements of the bond between the polyamide and polyurethane frequently approach and exceed the strength of the weakest component material, with the weakest component material tearing and breaking rather than the bond rupturing.

The following specific examples will serve to provide a still further and clearer and better understanding of the invention and its advantages. All "percents" and "parts" as used in these examples and elsewhere in the specification, and also in the claims, are percents and parts by weight, unless expressly stated otherwise.

*Example I*

Polyamide sheets (sheets of a polycaprolactam, type 6, nylon), drawn in the longitudinal axis of molecular orientation purposes, are obtained from commercial sources.

Sheets of polyesterurethane elastomers are prepared as follows: 1.704 mols of hydroxy poly(tetramethylene adipate) of a molecular weight of 849, a hydroxyl number of 130.4, and an acid number of 0.89 are mixed with 1.218 mols of butanediol-1,4. This mixture is melted in a kettle, with stirring, for about 20 minutes at a temperature of 100 to 110° C. and a pressure of 5 to 6 millimeters of mercury. There then is added 2.92 mols of diphenyl methane-p-p'-diisocyanate and the stirring continued for about one minute longer. Desirably, the interior surfaces of a can previously are coated with a release agent. The resulting mixture is promptly poured into the can and sealed, and the sealed can is placed in a 140° C. oven for about 3.5 hours. At the end of this oven heating, the product is cooled, removed from the can, and found to be a clear, snappy polyesterurethane elastomer having a Shore hardness of about 85. By molding this polyesterurethane elastomer product at 200° F. for about five minutes, transparent, amber, flexible, snappy sheets of a polyesterurethane elastomer are produced which are possessed of a tensile strength of about 6000 p.s.i., an elongation of 650 percent, and excellent abrasion resistance.

Useful belting materials are produced from these polyamide and polyesterurethane sheets. A solvent mixture consisting essentially of equal parts by weight of cresol and tetrahydrofuran is brushed on a surface of a polyamide sheet and also on a surface of a polyesterurethane elastomer sheet. The amount of solvent mixture applied to each is sufficient to provide a very thin film approximating several mils in thickness. Within about 5 to 10 minutes after application of the solvent mixture, the surfaces to which the solvent mixture has been applied no longer appear visibly wet, yet are tacky and softened. These tacky surfaces, one each of the polyamide and of the polyesterurethane, are promptly placed in firm contact with each other and hot-pressed at about 175° F. and 75 pounds per square inch for about 10 minutes. At this time, the resulting hot-pressed articles are removed from the press and permitted to cool and stand overnight at atmospheric environmental conditions (about 70° F.). The next day peel-strength measurements of the bond of the polyamide to the polyesterurethane are made. The measured peel strengths range from about 30 to 80 pounds per inch, with the majority of failures during peel-strength testing almost always being a tearing of one of the sheets, rather than being occasioned by a separation of the bonded interfaces of the two sheets.

For test purposes, in the preceding example and in other examples in which peel strength is measured, approximately the last one-to-two-inch length at one end of each of the two joined sheets are not wetted with a solvent-softening agent or solvent mixture. By this procedure, at this end of the bonded sheets there remains a portion of each sheet which is not bonded to the other sheet and which may be readily pulled apart and clamped to measure peel strength. Peel strengths are measured by means of a tensile testing machine in which jaws, located 180 degrees apart, of the tensile machine are moved at a speed of about two inches per minute away from each other, after each jaw has been clamped to an unbonded portion of sheet.

*Example II*

A surface of a molded polyamide sheet of an orientated type 6 polyamide, such as molded of "Plaskon 8205" of Allied Chemical Corporation, and a surface of a polyesterurethane sheet, such as commercially available sheet of "Estane 58013" of B. F. Goodrich & Company, are brushed with a solvent mixture consisting essentially of equal parts by weight of cresol and tetrahydrofuran to apply a thin, barely apparent, apparently continuous film of solvent to these surfaces. Within about 5 to 10 minutes, the applied thin film of solvent mixture no longer is visible to the naked eye, although the surfaces are softened and feel slightly tacky if touched. A tacky surface of the polyamide sheet and a tacky surface of the polyesterruethane sheet are then placed in contact with each other and the contacting sheets hot-pressed under about 75 pounds per square inch at a temperature of about 175° F. for 5 to 10 minutes. At this time, the hot-pressed product is removed from the press, cooled to room temperature, and, after standing under atmospheric environmental conditions for about 24 hours, is tested.

Peel-strength measurements of a plurality of bonded sheet articles prepared in the preceding manner are made. The measured peel strengths range from 30 to 80 pounds per inch and average about 35 pounds per inch.

A number of bonded sheet products prepared in this manner are made in the configuration of endless belts. These belts are used for driving pulleys of power-transmission devices, with the polyesterurethane elastomer side of the belt being the pulley contacting surface, and are found to give satisfactory service.

*Example III*

Employing like polyamide and polyesterurethane sheets and also the same solvent mixture, as employed in Example II, the solvent mixture is applied only to the surface of the polyamide, while the surface of the polyesterurethane elastomer sheet is not pretreated. After the surface of the polyamide sheet, to which the solvent mixture has been applied, is no longer wet in appearance, yet is slightly tacky to the touch, this surface is brought in contact with the nonpretreated surface of the polyesterurethane sheet and the contacting sheets hot-pressed at 175° F. for about 10 minutes, under about 75 p.s.i. After hot-pressing, the sheets are cooled, permitted to stand about 24 hours, and the peel strength of the bond holding the two sheets together is measured. Tests on a plurality of sheets produced in this manner gave measured peel strengths averaging 35 pounds per inch, with peel-strength values ranging from 25 to 45 pounds per inch.

For comparison purposes, sheets of the same polyamide and polyesterurethane materials employed in Examples I and II are hot-pressed in the manner employed in Examples I and II, with and without various surface pretreatments of various solvent mixtures. Table 1, which follows, tabulates the peel strength for the embodiments of the invention produced in Examples II and III, and also tabulates the peel strength of a number of comparison products, which are identified by letters. The comparison examples include examples of which there was no pretreatment of either a surface of the polyamide or the polyesterurethane, a pretreatment of only one of these surfaces, and pretreatment of each one and of both surfaces with only a single solvent-softening agent for the polyamide and a single solvent-softening agent for the polyesterurethane.

TABLE 1

| Example | Surface Pretreatment of— | | Peel Strength (lbs./inch) | |
|---|---|---|---|---|
| | Polyamide | Polyesterurethane | Range | Avg. |
| II | 50% Cresol, 50% THF.[a] | 50% Cresol, 50% THF.[a] | 30–80 | 35+ |
| III | do | None | 24–45 | 35 |
| Comparison: | | | | |
| A | None | do | 0 | 0 |
| B | 100% Cresol | do | 5–20 | 10 |
| C | None | 100% Cresol | 0 | 0 |
| D | Cresol | Cresol | 6–30 | 15 |
| E | 100% THF [a] | None | 0 | 0 |
| F | None | 100% THF [a] | 0 | 0 |
| G | 100% THF [a] | 100% THF [a] | 0 | 0 |
| H | None | 50% Cresol, 50% THF.[a] | 0 | 0 |

[a] THF=tetrahydrofuran.

*Example IV*

Example II is repeated, with the solvent mixture being sprayed on the surfaces instead of being brushed, and is repeated with the polyamide and polyesterurethane sheets being rapidly dipped for a brief immersion in the solvent mixture instead of being applied by brushing. In each instance, substantially equivalent belting material products are obtained.

*Example V*

The procedure of Example II is repeated, except that in place of the polyesterurethane employed in Example II, another commercially available thermoplastic polyesterurethane elastomer is substituted, such as "Texin 280A" of the Mobay Chemical Company. It is understood that this commercially available material is a thermoplastic polyesterurethane, substantially free of cross-linkages, which is derived principally from polyesters, diphenyl methane diisocyanate and a diol. The "Texin 280A," as received, is calendered into a 30-mil-thick sheet.

Belt material products substantially equivalent to those of Example II are produced.

*Example VI*

Example II is repeated with the solvent mixture of Example II being replaced respectively by each of the solvent mixtures, described below, which consist essentially of:

(a) 65% by weight of cresol and 35% by weight of tetrahydrofuran;

(b) 35% by weight of cresol and 65% by weight of tetrahydrofuran;

(c) 80% by weight of cresol and 20% by weight of tetrahydrofuran; and (d) 20% by weight of cresol and 80% by weight of tetrahydrofuran.

The resulting bonded sheet products possess peel strength approximating the peel strength of the belting material product of Example II, although, with some of these solvent mixtures, several applications of a solvent mixture to surfaces of the belting material components are made to insure adequate softening and tackification of the surfaces before uniting and hot-pressing the tacky surface sheets together.

*Example VII*

The procedure of Example II is repeated, except that the cresol in the solvent mixture is replaced by phenol, and this solvent mixture applied to the surfaces of the polyamide and the polyesterurethane; the procedure of Example II is repeated, except that the tetrahydrofuran in the solvent mixture is replaced by dimethyl formamide, and this solvent mixture applied to the surfaces of the polyamide and the polyesterurethane; and the procedure of Example II is repeated except that the solvent mixture of Example II is applied to the surface of the polyamide and a solvent mixture consisting essentially of equal parts of phenol and tetrahydrofuran is applied to the surface of the polyesterurethane. In each instance, satisfactory belting material products are produced.

Example VIII

When the procedure of Example II is repeated and, except instead of hot-pressing of the contacting polyamide and polyesterurethane sheets having a tacky surface of each contacting a tacky surface of the other, the bonding is permitted to occur merely by firmly contacting the sheets and by permitting the firmly contacted sheets to stand and age under atmospheric environmental conditions for at least 72 hours, substantially equivalent belting material products are produced.

Example IX

Commercially available thermoplastic polyesterurethane elastomers (100 parts thereof) are milled to intimately incorporate therein about 10 to 50 parts of EPC carbon black and a conductive carbon black. The milled compounded polyesterurethanes containing carbon black then are calendered at 300° F. to provide smooth-surfaced, thin sheets. The procedure of Example II then is repeated, employing in place of the polyesterurethane sheet thereof, sheets of the above-described compounded polyesterurethane elastomers containing carbon black. A plurality of the thus-prepared bonded products range in peel strengths from 20 to 65 pounds per inch and average in peel strength about 25 pounds per inch.

Example X

Polyamide sheets (sheets of a polycaprolactam, type 6, nylon), drawn in the longitudinal axis for molecular orientation purposes (such as "Plaskon 8205" of Allied Chemical Corporation) are employed. Polyoxypropylene glycol (1.8 mols) of a molecular weight of 950 is mixed with dipropylene glycol (1.1 mols). This mixture is heated at 100 to 110° C. and 5 millimeters of mercury for 20 minutes prior to the addition of 2.9 mols of diphenylmethane-p,p' diisocyanate with stirring for one minute. The resulting mixture is poured into a container, sealed and heated at 140° C. for about 3.5 hours in an oven. At the end of this oven heating, the product is cooled, removed from the container and molded into a sheet by pressing the polymer between the plates of a heated press.

Belting materials are produced from the polyamide and the polyetherurethane by brushing the surface of both sheets with a solvent mixture consisting essentially of equal parts by weight of cresol and tetrahydrofuran and following the procedure of Example I. Peel strengths average well above 20 pounds per inch.

Example XI

Employing like polyamide and polyetherurethane sheets and the solvent mixtures of Example X, the solvent mixture is applied only to the surface of the polyamide without any treatment of the polyetherurethane sheet. After the surface of the polyamide is no longer wet in appearance but while still tacky to the touch, the polyetherurethane is brought in contact with the treated surface of the polyamide, and the resulting two layers are hot-pressed at 175° F. for 10 minutes under 75 p.s.i. Thereafter, the sheets are allowed to stand for 24 hours and then subjected to peel strength determination which yields values greater than 20 pounds per inch.

Example XII

The procedure of Example X is repeated except that "Zytel 211" sold by E. I. du Pont de Nemours & Co. is used as the polyamide sheet.

Belt material products substantially equivalent to those of Example X are produced.

Example XIII

The procedure of Example X is followed except that in successive experiments the cresol is replaced by phenol, the tetrahydrofuran is replaced by dimethyl formamide and a cresol-tetrahydrofuran mixture is applied to the polyamide surface and a phenol-tetrahydrofuran mixture is applied to the polyetherurethane surface. In each instance, satisfactory belting materials are produced.

It is to be understood that various alternatives, changes, modifications, and embodiments of the invention will be obvious to those skilled in the art, from the preceding description and specific embodiments. All such alternatives, shapes, modifications, and embodiments falling within the true spirit and scope of the invention are intended to be included within the invention with the invention limited only as set forth in the appended claims.

What is claimed is:

1. An article of manufacture comprising a synthetic polyamide base having integrally bonded on at least one surface thereof a thermoplastic polyurethane which is soluble in solvents selected from the group consisting of tetrahydrofuran, dimethyl formamide and ketonic solvents and substantially free of cross-linkages, said polyurethane having been applied to the polyamide surface as a preformed solid by pre-softening the surface of the synthetic polyamide with a solvent mixture consisting essentially of from 10–90% by weight of a solvent softening agent for the synthetic polyamide and a balance essentially of a solvent softening agent for the polyurethane and uniting and maintaining the softened surface of the synthetic polyamide in firm contact with the polyurethane until a firm bond is effected.

2. The article of manufacture of claim 1 wherein said thermoplastic polyurethane is a polyester urethane.

3. The article of manufacture of claim 2 wherein said polyester urethane includes ether linkages in the ester moiety thereof.

4. The article of manufacture of claim 1 wherein said thermoplastic polyurethane is a polyether urethane.

5. The article of manufacture of claim 1 wherein said solvent mixture consists essentially of from 40–60% by weight of an aromatic hydroxy compound which is a solvent softening agent for said polyamide and from 40–60% by weight of a ketonic compound which is a solvent softening agent for said polyurethane.

6. The article of manufacture of claim 1 wherein firm contact with the polyurethane is maintained at a pressure of up to about 100 p.s.i. at an elevated temperature low enough to avoid substantial loss of molecular orientation in said polyamide until a firm bond is effected.

7. The article of manufacture of claim 1 wherein the solvent mixture contains cresol as a solvent softening agent for the polyamide and tetrahydrofuran as a solvent softening agent for the polyurethane.

8. The article of manufacture of claim 1 wherein the peel strength of the bond between said polyamide and polyurethane is more than about 20 pounds per inch of width.

9. The article of manufacture of claim 1 wherein the peel strength of the bond between said polyamide and polyurethane approximates the strength of the thermoplastic polyurethane.

10. An article of manufacture comprising a synthetic polyamide base having integrally bonded on at least one surface thereof a thermoplastic polyurethane which is soluble in solvents selected from the group consisting of tetrahydrofuran, dimethyl formamide and ketonic solvents and substantially free of cross-linkages, said polyurethane having been applied to the polyamide surface as a preformed solid by pre-softening the surfaces of the synthetic polyamide and the polyurethane with a solvent mixture consisting essentially of from 1–9 parts by weight each of a solvent-softening agent for the synthetic polyamide and of a solvent-softening agent for the thermoplastic polyurethane and uniting and maintaining the softened surface of the synthetic polyamide in firm contact with the polyurethane until a firm bond is effected.

11. The article of manufacture of claim 10 wherein the solvent mixture consists essentially of about equal parts by weight of the solvent-softening agents.

12. A process for producing a laminated article of manufacture comprising a synthetic polyamide base having integrally bonded on at least one surface thereof a preformed solid thermoplastic polyurethane member which is soluble in solvents selected from the group consisting of tetrahydrofuran, dimethyl formamide and ketonic solvents and substantially free of cross linkages, said method comprising the steps of wetting and softening a surface of the synthetic polyamide base with a solvent mixture consisting essentially of from 10–90% by weight of a solvent softening agent for the synthetic polyamide and a balance essentially of a solvent softening agent for said polyurethane and uniting and maintaining the softened surface of the synthetic polyamide base in firm contact with the polyurethane member at a pressure of less than 150 pounds per square inch and at a temperature of less than 225° F. until a firm bond is effected.

References Cited by the Examiner

UNITED STATES PATENTS

| | | | |
|---|---|---|---|
| 2,349,290 | 5/1944 | Loughborough | 161—227 X |
| 2,871,218 | 1/1959 | Schollenberger | 260—75 |
| 2,976,202 | 3/1961 | Salem et al. | 161—227 X |
| 2,978,376 | 4/1961 | Hulze | 156—306 X |
| 2,999,764 | 9/1961 | Rhoads | 117—47 |
| 3,033,734 | 5/1962 | Price. | |

FOREIGN PATENTS 730,042    5/1955    Great Britain.

EARL M. BERGERT, *Primary Examiner.*

C. B. COSBY, *Examiner.*